United States Patent [19]
Feierabend et al.

[11] 3,996,900
[45] Dec. 14, 1976

[54] REVOLVING PISTON COMBUSTION ENGINE OF TROCHOID TYPE

[75] Inventors: Karl Feierabend, Bad Rappenau-Treschklingen; Armin Bauder, Neckarsulm; Fritz Zimmermann, Bad Rappenau, all of Germany

[73] Assignee: Adui NSU Auto Union Aktiengesellschaft, Neckarsulm, Germany

[22] Filed: Aug. 20, 1975

[21] Appl. No.: 606,072

[30] Foreign Application Priority Data
Aug. 26, 1974 Germany .......................... 2440851

[52] U.S. Cl. ............ 123/8.09; 123/169 CL; 123/169 EL
[51] Int. Cl.² .................................. F02B 53/12
[58] Field of Search ............ 123/8.09, 8.45, 169 R, 123/169 CL, 169 EL

[56] References Cited
UNITED STATES PATENTS

| | | | |
|---|---|---|---|
| 3,081,753 | 3/1963 | Hurley et al. | 123/169 R X |
| 3,155,085 | 11/1964 | Jones et al. | 123/169 R |
| 3,606,602 | 9/1971 | Hamada et al. | 123/8.09 X |
| 3,800,179 | 3/1974 | Louzecky | 123/169 CL X |
| 3,831,562 | 8/1974 | Paxton | 123/8.09 |
| 3,918,419 | 11/1975 | Dolza | 123/32 ST X |

*Primary Examiner*—Carlton R. Croyle
*Assistant Examiner*—Michael Koczo, Jr.
*Attorney, Agent, or Firm*—Kane, Dalsimer, Kane, Sullivan and Kurucz

[57] ABSTRACT

A revolving piston combustion engine of trochoid type includes a housing composed of a shell with a multiarcuate inner surface and parallel ends and in which a polygonal piston is disposed to be eccentrically rotatable. Inlet and outlet passages are arranged in the housing. The shell is provided with at least one spark plug, the spark gap of which lies between at least two electrodes near the inner surface of the shell.

2 Claims, 13 Drawing Figures

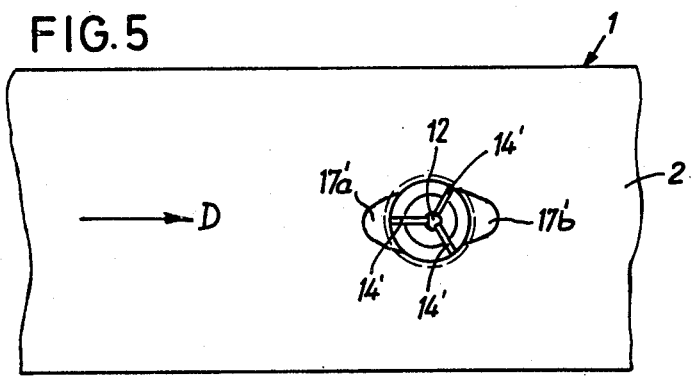
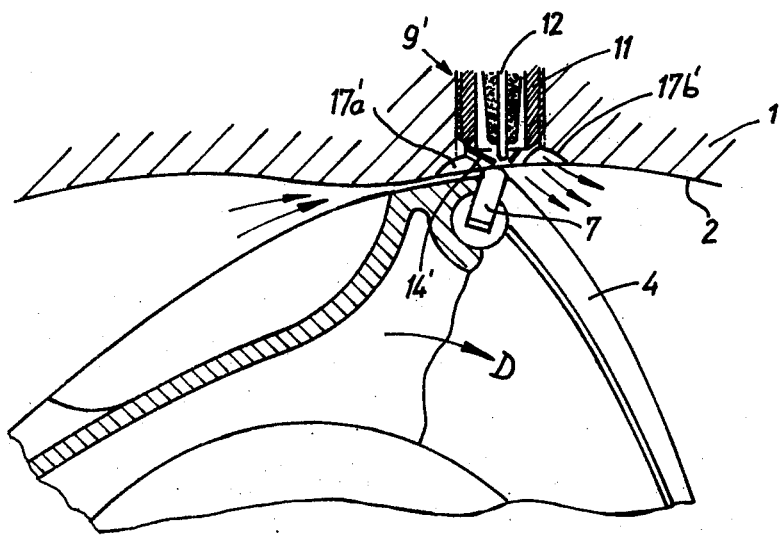

REVOLVING PISTON COMBUSTION ENGINE OF TROCHOID TYPE

BACKGROUND OF THE INVENTION

For proper operation of an internal combustion engine, it is required that in all operating conditions, an ignitable mixture shall be present at the spark plug, and in the space containing the electrodes. In certain operating conditions, this requirement may not be fulfilled, as for example, when operating at low loads, where the gas in the electrode space contains a high proportion of exhaust. In operation of the engine with an excess of air which is desirable for low consumption and clean exhaust, it is likewise not assured that there will always be an ignitable mixture at the spark electrodes.

In the case of revolving piston engines, a further problem arises through the need to employ spark plugs of high heat rating that will withstand the thermal stress of full load. Spark plugs of high heat rating have a minimum of heat absorbing surface and an electrode space of minimum size, with the result that at partial load the gas in the electrode space is exchanged for fresh gas in small part only, thus containing a high proportion of exhaust and consequently, is not very ignitable. Furthermore, there are no major gas currents in the electrode region, so that any deposits formed are not blown away. This may cause spark plug failure by short circuit unless special ignition systems with a rapid voltage rise are used.

SUMMARY OF THE INVENTION

The object of the invention is to provide a revolving piston combustion engine in which the presence of an ignitable mixture in the region of the spark plug electrodes is assured in all operating conditions, including in particular partial load and operation with excess of air; and the spark plugs are kept clean as well.

This object is accomplished according to the invention, in that in the inner surface of the shell at least one recess is provided, extending essentially in the direction of rotation of the piston, opening into the space containing the electrodes, and leading all the way to the plane of the spark gap. This recess may optionally be in the face of the spark plug mount and/or in the face of the spark plug itself.

Thus, the space between the electrodes is effectively flushed with fresh gas in all operating conditions. This ensures that even a low load and in operation with excess of air, an ignitable mixture will be present in the region of the spark plug electrodes, and any deposits formed will be blown out.

When a spark plug having a central electrode and a ground electrode extending substantially radially towards the former is used, the recess should run transverse to the ground electrode. This ensures that the flow of fresh gas through the gap between the two electrodes will not be impeded by the ground electrode. This particular position of the ground electrode in the case of a screw-in spark plug, may be achieved by placing the ground electrode in a definite relation to the beginning of the thread when the spark plug is made, and also by placing the beginning of the internal thread in the housing shell in a definite relation to the surface of the shell. This can be done with comparative ease by using a spark plug mount of known configuration to be pressured, shrunk or cast into the shell and containing the internal thread to accept the spark plug.

Alternatively, an elastic packing ring may be provided between spark plug and shell, permitting the spark plug to be rotated, without breaking the seal, into a position in which the ground electrode is placed as desired. Instead of a screw-in spark plug, however, a push-in spark plug may be used, to be fixed with a box not, suitable guides, stops or the like being provided to allow the spark plug to be inserted only in that position in which the ground electrode is placed as desired.

The fixation of the spark plug in a very specific position may be dispensed with particularly if the recess in the face of the spark plug extends substantially over the entire outer boundary edge of the space containing the electrodes. By means of such a recess, concave or conical for example, an ignitable mixture can always reach the region of the electrode interval, quite independently of the setting of the ground electrode.

In another alternative, instead of one ground electrode, three ground electrodes for example spaced 120° apart and extending radially towards the central electrode may be provided; and the recess occurs not only in the face of the spark plug housing, but also in the inner shell surface and/or in the face of a spark plug mount. Then even in the least favorable case, where one ground electrode points in the direction of rotation of the piston, two electrode intervals are flushed with fresh gas.

Still another possibility for ensuring flow through the electrode interval regardless of the position of the ground electrode is to use a spark plug having a central electrode and a ground electrode extending substantially radially towards the same and lying in the face of the spark plug housing. The fact of the spark plug housing is set back on either side of the ground electrode. The edge of the hole in the inner surface of the shell that receives the spark plug housing is provided with two diametrically opposed recesses arranged at an angle of about 45° to the longitudinal median plane passing through the center of the hole. If the ground electrode with the spark plug screwed in stands perpendicular to the direction of rotation of the piston, the fresh gas can flow directly through the setback parts of the face of the spark plug housing and through the exposed electrode interval. If the spark plug is significantly rotated out of this position, in other words, in the extreme case, if the ground electrode lies in the longitudinal median plane of the shell, fresh gas can flow through one of the pockets arranged in the inner surface of the shell to one of the spaces formed by the setback of the face of the spark plug housing, then can flow through the exposed electrode interval and finally through the other space formed in the face of the spark plug housing and the other recess in the inner surface of the shell.

The provisions of the invention are preferably applied to a spark plug arranged in that region of the inner surface of the shell in which no substantial pressure difference prevails between the two working chambers separated from each other by a sealing blade while the blade is passing by. This will reduce leakage losses from one working chamber to the other to a minimum. With this placement of the spark plug it is desirable according to known practices to provide a trough in each flank of the piston, the greater portion of the volume of which trough lies in the region of the piston flank foremost in the direction of rotation of the piston.

When following the teachings of the invention such good ignitability is obtained that ordinary inexpensive ignition systems, for example with coil ignition may be used.

BRIEF DESCRIPTION OF THE DRAWINGS

Other details and features of the invention will appear from the following description with reference to the drawings, representing some embodiments of the invention by way of example.

FIG. 4 shows a section similar to FIG. 2 of another embodiment of the invention where the recesses are arranged in the inner surface of the shell and a spark plug with three ground electrodes is used;

FIG. 5 shows a top view of the inner surface of the shell in the embodiment of FIG. 4;

DETAILED DESCRIPTION

Figure 1:
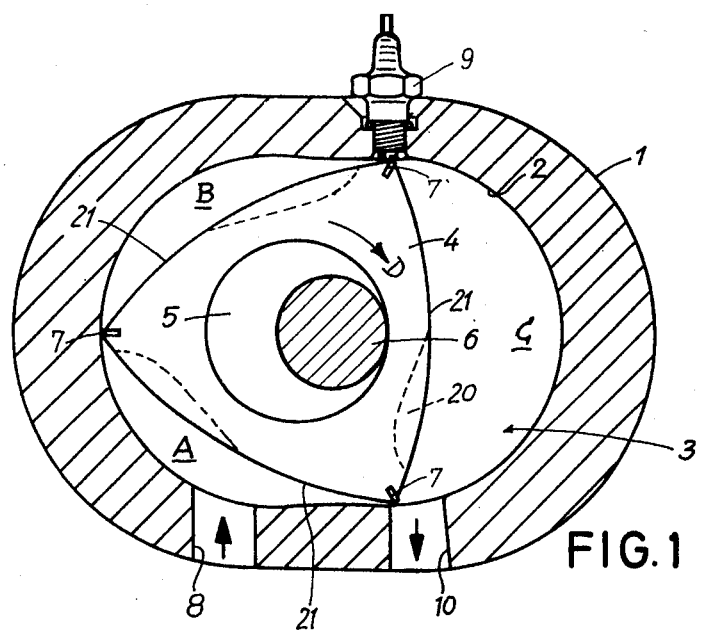
FIG. 1 shows a schematic representation of a revolving piston engine of trochoid type.

Reference is first made to FIG. 1, schematically representing a revolving piston engine of trochoid type having a housing composed of a shell 1 with biarcuate inner surface 2 and parallel ends 3. In the housing, a triangular piston 4 is rotatably mounted on the eccentric 5 of an eccentric shaft 6. The piston 4 has sealing blades 7 at its vertices, to sweep along the inner surface 2 of the shell throughout the rotation of the piston 4, thus forming working chambers A, B and C of variable volume in direction of rotation D. To execute a four-stroke process in each of these chambers the shell 1 is provided with a fresh gas inlet 8, at least one spark plug 9, and an outlet 10 for burned gases. The inlet 8 may alternatively be arranged in either or both ends 3.

The spark plug 9 in the example of this embodiment is arranged in a region of the inner surface 2 of the shell where when traversed by a sealing blade 7, substantially the same pressure prevails in the working chambers B and C separated by the blade. The flanks 21 of the piston are provided with troughs 20. The greater portion of the volume of the troughs lies in the leading part of the flank in the direction of rotation D of the piston.

Figure 3:
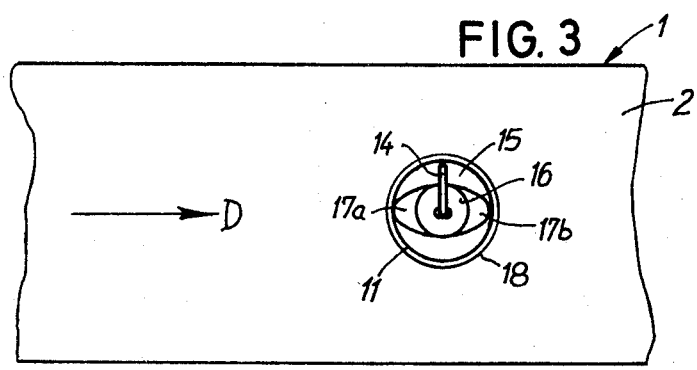
FIG. 3 shows a top view of the inner surface of the shell in the region of the spark plug in the example represented in FIG. 2.
Figure 2:
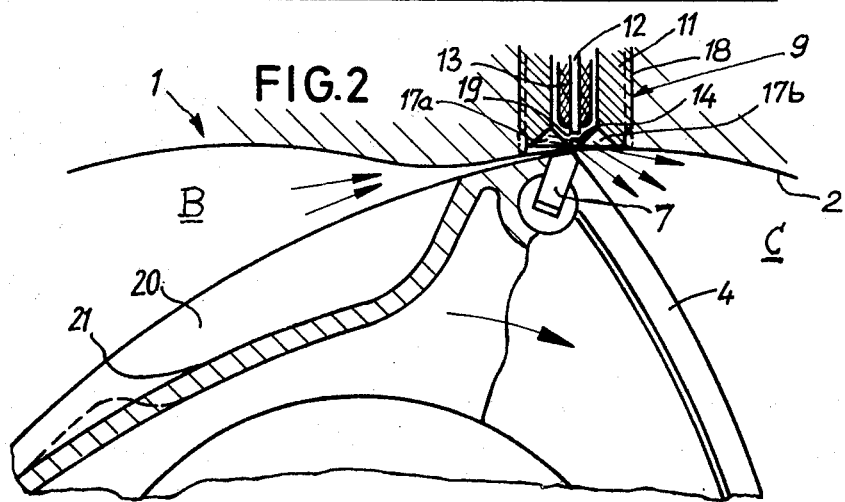
FIG. 2 shows an enlarged representation of the ignition region of the revolving piston engine shown in FIG. 1 according to one embodiment of the invention.

An embodiment of the invention is represented in FIGS. 2 and 3. The conventional spark plug 9 here shown consists of a housing 11, a central electrode 12 surrounded by an insulator 13, and a ground electrode 14 arranged at the face 15 of the housing 11 and extending radially over the end of the central electrode 12. The housing 11 is screwed into a threaded hole 18 in the shell 1 of the housing, in such that the face 15 of the housing 11 lies as close as possible to the inner surface 2 of the shell and the ground electrode 14 lies about perpendicular to the direction of rotation D of the piston 4. The space containing the electrodes 12 and 14 is formed by the central hole 16 in the spark plug housing 11. In the face of the housing 11, two recesses 17a, 17b are arranged diametrically opposed to each other with respect to the space 16 and extending in the direction of rotation D of the piston, and hence perpendicular to the ground electrode 14. When the mouth of the spark plug hole 18 is traversed by a sealing blade 7, fresh gases can flow from chamber B through recess 17a and through the interval 19 forming the spark plug between electrodes 12 and 14 and then through recess 17b into chamber C, providing an effective flushing of the space 16 containing electrodes 12 and 14 with fresh gases before ignition occurs. At the moment of ignition, which occurs when piston 4 has rotated far enough in direction D so that the centroid of the trough 20 arranged in each flank of the piston is under the spark plug 9, an ignitable fuel-air mixture is therefore present in the region of electrodes 12, 14.

To achieve a dependable flow of fresh gas through the electrode interval 19, it is advantageous in the embodiment of FIGS. 2 and 3 if the ground electrode 14 lies about perpendicular to the direction of rotation D of the piston, that is, with the recesses 17a, 17b extending in the direction of rotation D. This wall requires that special care be taken in positioning the spark plug, or else adopt the use of push-in spark plugs which are known to those skilled in the art.

The latter considerations are avoided, at least in regard to the position of the recesses 17a and 17b, in the embodiment of FIGS. 4 and 5. Here the recesses 17a' and 17b' are arranged in the inner surface 2 of the shell, and a spark plug 9' is used having three ground electrodes 14' arranged 120° apart. By arranging the recesses 17a' and 17b' in the inner surface 2 of the shell, the location of these recesses relative to the direction of rotation D of the piston is of course rendered independent of the angular setting of the spark plug. Even in the adverse position of the spark plug as shown, where one ground electrode 14' lies in the direction of rotation D, flow through the spark gap between two ground electrodes 14' and the central electrode 12 is assured. This guarantees the presence of an ignitable mixture in the region of the spark plug electrodes at the time of ignition.

Figure 7:
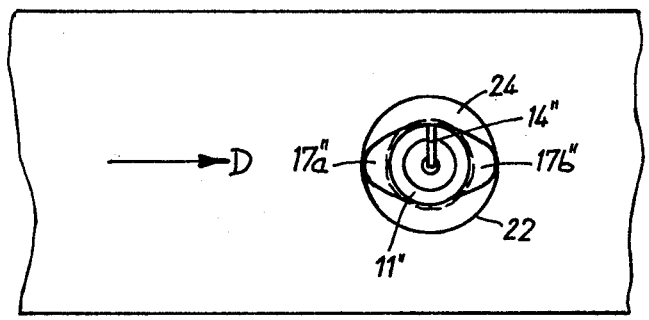
FIG. 7 shows a top view of the inner surface of the shell in the embodiment of FIG. 6.
Figure 6:
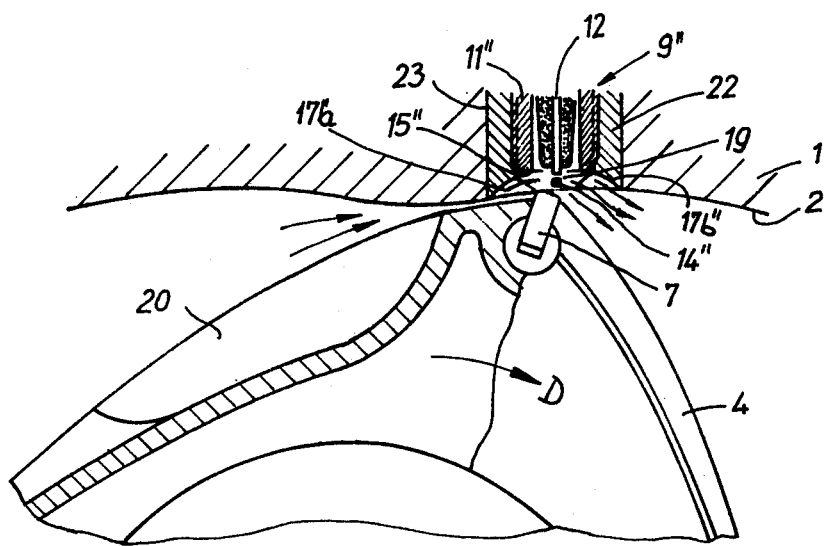
FIG. 6 shows a section similar to FIGS. 2 and 4 of still another embodiment of the invention where the spark plug is screwed into a mount and the recesses are arranged in the face of said mount.

In the embodiment represented by way of example in FIGS. 6 and 7, the spark plug 9'' is screwed into a mount 22 shrunk or pressed into a hole 23 in the shell 1 of the housing or alternatively cast in during fabrication of the shell 1. The face 24 of the mount is flush with the inner surface 2 of the shell. The spark plug 9" is of the same structure as the spark plug in FIGS. 2 and 3 with the sole difference that the ground electrode 14" is not in the plane of the face 15" of the spark plug housing 11", so that the spark gap 19 is exposed. In this embodiment, as in the embodiment of FIGS. 4 and 5, the location of the recesses 17a" and 17b" is independent of the angular setting of the spark plugs. The mode of operation of this embodiment is the same as that of the example in FIGS. 2 and 3.

Figure 8:
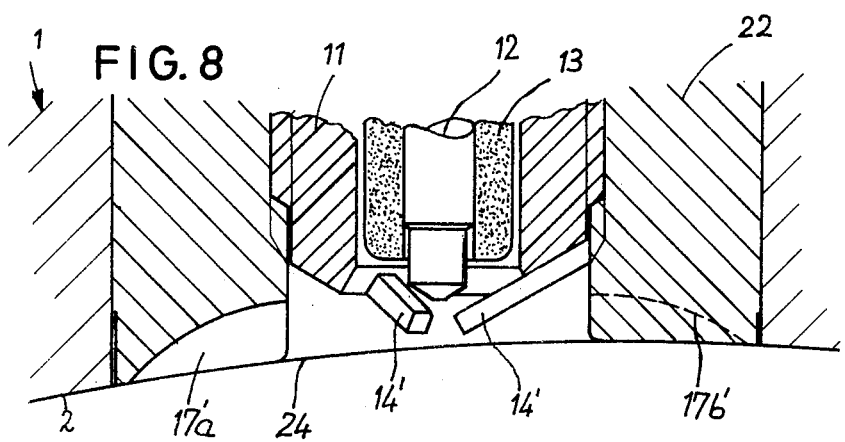
FIG. 8 shows a modification of the embodiment of FIG. 6.

FIG. 8 shows an embodiment having a spark plug with three ground electrodes 14' 120° apart in addition to the central electrode 12, like the embodiment of FIGS. 4 and 5, of which ground electrodes, however, only two are visible. As in the embodiment of FIGS. 6 and 7, the spark plug is in this case arranged in a mount 22 in the face 24 of which the recess 17a' is provided. The recess 17b' shown dotted may optionally be omitted. This applies also to the other embodiments given by way of example.

Figure 9:
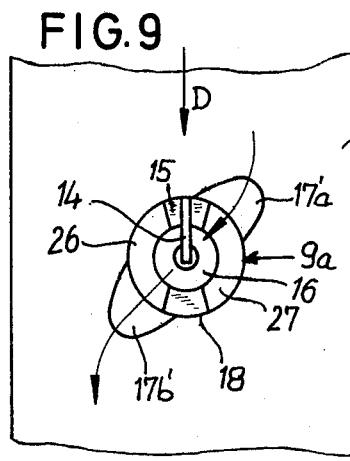
FIG. 9 shows a top view of the inner surface of the shell in a fourth embodiment of the invention, where recesses are provided both in the face of the spark plug housing and in the inner surface of the shell and where the ground electrode of the spark plug lies in the direction of rotation of the piston.
Figure 10:
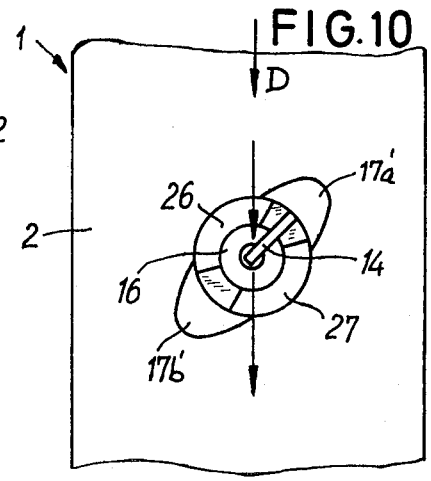
FIG. 10 shows a top view similar to FIG. 9 but with the spark plug rotated out of its position in FIG. 9.

In the embodiment of FIGS. 9 and 10, the spark plug 9a has a ground electrode 14 lying in the plane of the face 15 of the spark plug housing as in the embodiment of FIGS. 2 and 3, but the face 15 is set back at 26 and 27 on either side of the ground electrode 14. In the inner surface 2 of the shell two recesses 17a' and 17b' are provided, breaching the edge of the hole 18 accommodating the spark plug 9a. The recesses are diametrically opposed to each other and arranged at an angle of about 45° to the longitudinal median plane passing through the center of the hole 18. In this embodiment, the flow through the electrode space 16 is again independent of the angular setting of the spark plug.

FIG. 9 represents another position of the spark plug in which the ground electrode 14 lies in the direction of rotation D of the piston and thus obstructs the interval between the electrodes. Through the recesses 17a' and 17b' and the depressions 26 and 27 in the face of the spark plug housing, however, the electrode space can be flushed nevertheless as indicated by the arrows. If the ground electrode 14, when the spark plug is screwed in, lies oblique to the direction of rotation D of the piston as shown in FIG. 10, the fresh gas can flow through depressions 26 and 27 and so flush the space 16 accommodating the electrodes.

Figure 11:
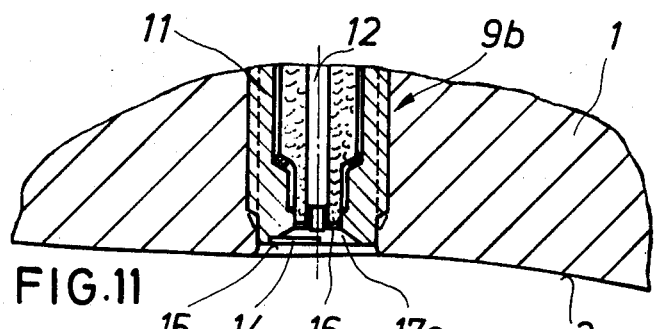
FIG. 11 shows a section similar to FIG. 2 of a fifth embodiment of the invention, where a recess extending over the entire edge of the space containing the electrodes is arranged in the face of the spark plug.
Figure 12:
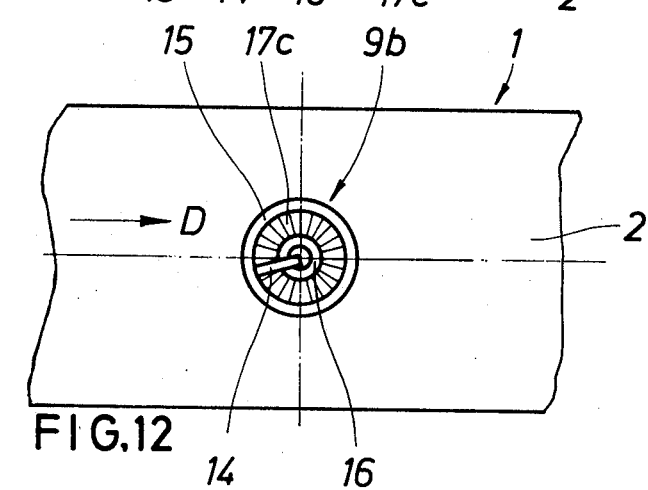
FIG. 12 shows a top view of the inner surface of the shell in the embodiment of FIG. 11.
Figure 13:
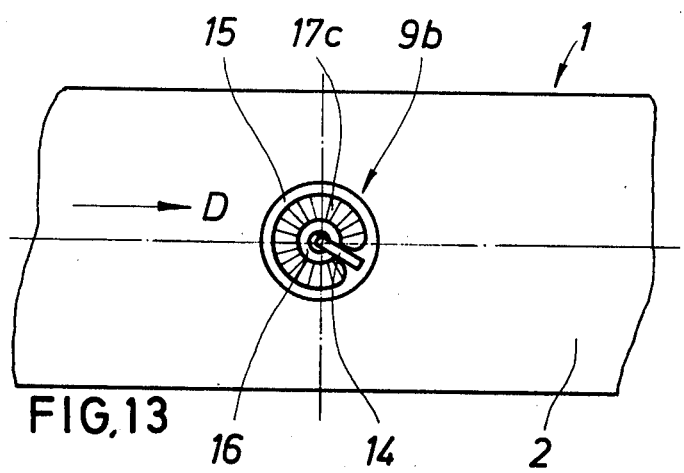
FIG. 13 shows a top view of the inner surface of the shell in the embodiment of FIG. 11 where, however, the recess extends only to either side of the ground electrode.

FIGS. 11, 12 and 13 by way of example, show an embodiment of a spark plug 9b whose ground electrode 14 as in the embodiment of FIGS. 2 and 3, likewise lies in the plane of the face 15 of the spark plug housing 11. In departure from the embodiment of FIGS. 2 and 3, instead of the recesses 17a and 17b in the face 15 of the housing 11 a concave or conical recess 17c is provided. As indicated in FIG. 12 the recess extends over the entire rim of the central hole or outer boundary edge of the space 16 containing the electrodes; or as shown in FIG. 13 the recess extends all the way to the ground electrode 14 on either side and into the plane of the spark gap between electrodes 12 and 14. For the sake of clarity, the recesses 17c have been shaded in FIGS. 12 and 13. In this preferred embodiment, the space 16 containing the electrodes is effectively flushed quite independently of any random angular setting of the spark plug 9b and its ground electrode 14, so that an ignitable mixture will always be present at the time of ignition.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A rotary piston internal combustion engine of trochoidal type comprising; a housing composed of a shell with a multi-lobed inner surface and of parallel end walls, a polygonal piston mounted for eccentric rotation within said housing, said piston having sealing blades at its vertices which slide along the inner surface of the shell, inlet and outlet ports in the housing at least one spark plug arranged in a hole in the shell and having an endface near the inner surface of the shell, a space is said endface, a center electrode extending into said space and terminating short of said endface, at least one ground electrode extending laterally into said space toward the center electrode to form a spark gap therewith, a recess in said endface extending substantially over the entire outer boundary edge of said space and into the place of said spark gap, the spark plug being arranged in that region of the inner surface of the shell where during passage of a sealing blade no substantial pressure difference prevails between the two working chambers separated from each other by said blade, each flank of the piston being provided with a trough the greater portion of the volume of which lies in the leading part of the flank relative to the direction of rotation of the piston.

2. The invention is claimed in claim 1 wherein said ground electrode lies in the plane of said endface and overlies said center electrode, and said recess extends all around said edge except at the point of attachment of said ground electrode to said endface.

* * * * *